(No Model.)
B. P. WHITNEY.
CULTIVATOR.
No. 447,992. Patented Mar. 10, 1891.
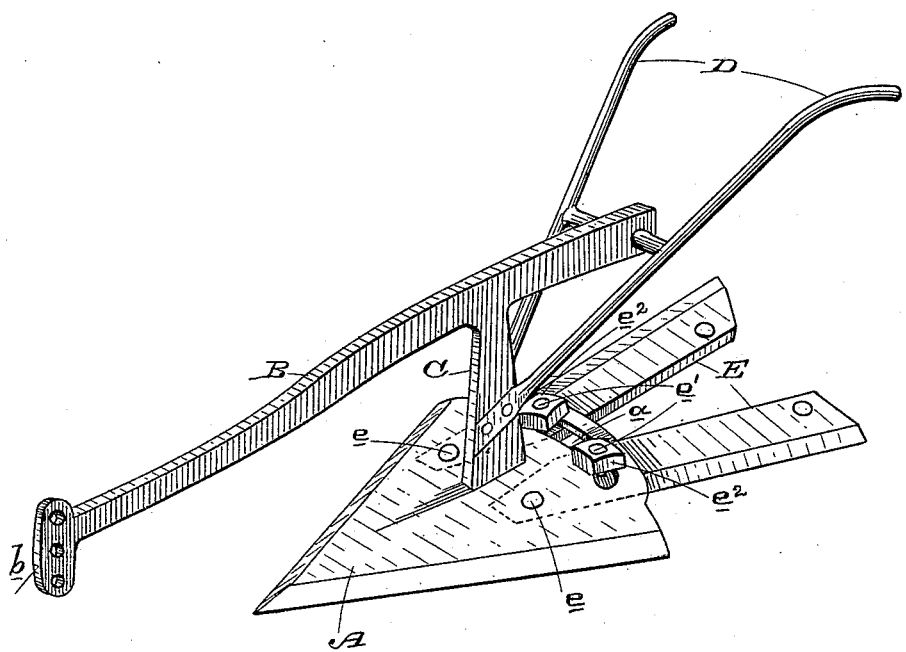
Witnesses:
J. L. Hause
H. C. Lee.
Inventor,
Benjamin P. Whitney
By Dewey & Co.
attys

UNITED STATES PATENT OFFICE.

BENJAMIN PIPES WHITNEY, OF LOS ALAMOS, CALIFORNIA, ASSIGNOR OF ONE-HALF TO W. F. WICKENDEN, OF SAME PLACE.

CULTIVATOR.

SPECIFICATION forming part of Letters Patent No. 447,992, dated March 10, 1891.

Application filed August 25, 1890. Serial No. 363,028. (No model.)

*To all whom it may concern:*

Be it known that I, BENJAMIN PIPES WHITNEY, a citizen of the United States, residing at Los Alamos, Santa Barbara county, State of California, have invented an Improvement in Cultivators; and I hereby declare the following to be a full, clear, and exact description of the same.

My invention relates to cultivators which are specially adapted for weed and bean cutting as well; and my invention consists in a triangular-shaped share or cutting-point having attached to it a beam and handles substantially similar to those of a plow and adjustably connected with its rear end novel extension-blades, all of which I shall I hereinafter fully describe.

The object of my invention is to provide a simple and effective cultivator adapted to be adjusted to suit the requirements of the work.

Referring to the accompanying drawing for a more complete explanation of my invention, the figure is a perspective view of my implement.

A is the share or point, formed of a metal plate in the shape of an isosceles triangle approximately.

B is a beam having a clevis $b$ for regulating the depth.

C is the beam-standard secured to the share or point, and D are the handles.

E are the extension-blades. These are metal strips having their outer edges sharpened sufficiently to cut the weeds and beans, and the side edges of the share or point are similarly sharpened. The extension-blades are pivoted at the points $e$ to the under side of the share or point, so that they may be swung outwardly or inwardly, diverging backwardly. To hold them in any position or any angle to which they may be adjusted, they have pins or studs $e'$, which extend upwardly through a curved elongated slot $a$ in the back of the share or point, and said pins or studs receive nuts $e^2$ on their upper ends, which when loosened permit the movement of the extension-blades and when tightened hold them in the position to which they are adjusted. This adjustability of the blades provides for use in different width of rows.

The implement runs light in the ground—say from two to three inches. It can be raised or lowered to suit the worker and to work in any kind of soil and leaves the ground smooth and loose. It can be changed to run in any width from, say, sixteen to forty-eight inches. It can be used to cut weeds between the furrows of corn, potatoes, beans, &c., or to cut the beans themselves. It can also be used for hilling by attaching mold-boards from the extensions to the point. It runs true and easy.

Having thus described my invention, what I claim as new, and desire to secure by Letters Patent, is—

1. In a cultivator, the combination of the triangular share or point, the rearwardly-divergent extension-blades adjustably secured to said share or point, whereby they may be set at different angles and the beam connected with the share, substantially as herein described.

2. A cultivator consisting of the triangular share or point having the slot in its rear portion, the beam-standard secured to said share or point, the beam and the handles carried by the standard, the rearwardly-divergent extension-blades pivoted at their forward ends to the point or share and having pins or studs projecting through its slot, and the nuts on the pins or bolts for fixing the blades where adjusted, substantially as herein described.

In witness whereof I have hereunto set my hand.

BENJAMIN PIPES WHITNEY.

Witnesses:
C. H. PEARSON,
R. A. McCOMBS.